United States Patent
Martiška et al.

(10) Patent No.: US 12,510,223 B2
(45) Date of Patent: Dec. 30, 2025

(54) ILLUMINATION DEVICE FOR VEHICLE HEADLAMPS

(71) Applicant: ZKW Group GmbH, Wieselburg (AT)

(72) Inventors: Matej Martiška, Lovce (SK); Anton Kokoška, Zázrivá (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/953,241

(22) Filed: Nov. 20, 2024

(65) Prior Publication Data

US 2025/0172269 A1 May 29, 2025

(30) Foreign Application Priority Data

Nov. 27, 2023 (EP) ..................................... 23212201

(51) Int. Cl.
*F21S 41/683* (2018.01)
*F21S 41/143* (2018.01)
(Continued)

(52) U.S. Cl.
CPC ........... *F21S 41/683* (2018.01); *F21S 41/143* (2018.01); *F21S 41/25* (2018.01); *F21W 2102/135* (2018.01); *F21W 2107/13* (2018.01)

(58) Field of Classification Search
CPC .......... F21S 41/64; F21S 41/25; F21S 41/255; F21S 41/143; F21S 41/683; F21S 41/686;
(Continued)

(56) References Cited

U.S. PATENT DOCUMENTS 5,113,319 A 5/1992 Sekiguchi et al.
5,158,352 A 10/1992 Ikegami et al.
(Continued)

FOREIGN PATENT DOCUMENTS

CN 202691916 U 1/2013
DE 10335952 B4 * 12/2004 ............... B60Q 1/10
(Continued)

OTHER PUBLICATIONS

Extended European Search Report Issued for European Patent Application No. 23212201.0 dated Jun. 4, 2024 (23 Pages).

*Primary Examiner* — Erin Kryukova
(74) *Attorney, Agent, or Firm* — Eversheds Sutherland (US) LLP (57) ABSTRACT

An illumination device, for vehicle headlamps, includes a light source, a shutter device, and a projection lens. The shutter device has a first shutter body with a first shutter plane including a first shutter edge, and a second shutter body with a second shutter plane including a second shutter edge. The first and second shutter bodies are arranged such that their shutter edges build a common shutter edge, which generates a cut-off line of a light distribution. The shutter device is configured to transition the first and second shutter edges between (i) aligned positions wherein the common shutter edge contributes to generate a straight cut-off line, and (ii) non-aligned positions wherein the common shutter edge contributes to generate a cut-off line deviating from a straight cut-off line. The transition is performed by rotation of the first and/or second shutter body about a common rotation axis by a rotation device.

20 Claims, 7 Drawing Sheets (51) Int. Cl.
*F21S 41/25* (2018.01)
*F21W 102/135* (2018.01)
*F21W 107/13* (2018.01)

(58) Field of Classification Search
CPC ...... F21S 41/689; F21S 41/692; F21S 41/698; F21W 2102/135; F21W 2107/13; F21W 2107/17; B60Q 2300/135; B60Q 1/124; B60Q 1/122
See application file for complete search history.

(56) References Cited

U.S. PATENT DOCUMENTS

| | | | | |
|---|---|---|---|---|
| 8,113,700 | B2* | 2/2012 | Hung | F21S 41/686 362/191 |
| 2011/0110113 | A1* | 5/2011 | Hung | F21S 41/686 362/539 |
| 2014/0145612 | A1* | 5/2014 | Takagaki | B60Q 1/1423 315/82 |

FOREIGN PATENT DOCUMENTS

| | | |
|---|---|---|
| EP | 1201989 A2 | 5/2002 |
| JP | 2013032127 A | 2/2013 |

\* cited by examiner

ILLUMINATION DEVICE FOR VEHICLE HEADLAMPS

CROSS-REFERENCE TO RELATED APPLICATIONS

This application claims priority to European Patent Application No. 23212201.0, filed Nov. 27, 2023, which is incorporated herein by reference.

FIELD OF THE INVENTION

The invention relates to an illumination device for vehicle headlamps, especially for single-track vehicle headlamps, in particular for motorcycle headlamps, wherein the illumination device is configured to form a light distribution with a cut-off line and comprises: at least one light source configured to emit light in a main direction for forming the light distribution, a shutter device arranged downstream of the at least one light source along the main direction, wherein the shutter device is configured to generate the cut-off line in the light distribution, a projection lens for projecting the generated light distribution of the at least one light source in conjunction with the shutter device in front of the illumination device, wherein the projection lens comprises an optical axis, and a holder configured to hold the shutter device and the projection lens.

BACKGROUND

A problem encountered in the case of single-track motor vehicles, such as motorcycles, as they are driven around curves due to the inclination of the vehicle. As a rule, a headlight that is rigidly connected with the motorcycle or with the fork of the motorcycle can no longer illuminate the roadway in front of the motorcycle in an optimum fashion.

It should be noted that the invention is basically suitable for every vehicle that experiences inclination during cornering.

The setup of the light distribution, in particular a low beam distribution, is prescribed by law and measured on the vehicle standing straight. In each turn, the vehicle tilts with the headlamp or the illumination device about the longitudinal axis of the vehicle.

As a result, on one hand the visibility in the curve is reduced, on the other hand the oncoming traffic is blinded. This leads to a significant impairment of traffic safety.

There are various approaches in the state of the art to remedy this problem; by way of example, it might be mentioned that one can make provision for positioning the entire headlight in the motorcycle in an accordingly movable manner so that it can be swung simply upon the inclination of the motorcycle.

This is disadvantageous since the positioning of the entire headlight of the motorcycle is expensive, and also, since the entire headlight must be swung when driving around a curve. As a result, one must move a relatively great mass, the movement becomes slow, and furthermore, much structural space is required.

SUMMARY OF THE INVENTION

It is an object of the invention to provide an enhanced illumination device for vehicle headlamps. To achieve this object the shutter device is formed of:
a first shutter body with a first shutter plane comprising a first shutter edge, and
a second shutter body with a second shutter plane comprising a second shutter edge,
wherein the first and second shutter body are arranged to one another that the first and second shutter edge together build a common shutter edge, which generates the cut-off line in the light distribution,
wherein the shutter device is configured to transition between
 aligned positions of the first and second shutter edge, wherein the common shutter edge contributes to generate a straight cut-off line, and
 non-aligned positions of the first and second shutter edge, wherein the first and second shutter edge are inclined with respect to each other, so that the common shutter edge contributes to generate a cut-off line deviating from a straight cut-off line,
wherein the transition between the positions is performed by rotation of the first and/or second shutter body about a common rotation axis by means of a rotation device.

Advantageously, the first and second shutter body are rotatable independently and relative to each other about the common rotation axis.

Advantageously, the first shutter body comprises a first part-circular gliding surface complementary to a first counter circular gliding surface of the holder, wherein the first shutter body engages with the holder so as the first part-circular gliding surface and the first counter circular gliding surface can glide on one another.

Advantageously, the second shutter body comprises a second part-circular gliding surface complementary to a second counter circular gliding surface of the holder, wherein the second shutter body engages with the holder so as the second part-circular gliding surface and the second counter circular gliding surface can glide on one another.

Advantageously, the rotation device comprises a transmission element formed as a toothed wheel configured to engage with a toothed array of the first and/or second shutter body in order to convert an angular motion of the transmission element into a rotation motion of the first and/or second shutter body around the common rotation axis.

Advantageously, each shutter body comprises a toothed array, which is sectionally arranged on the first part-circular gliding surface on the first shutter body, sectionally arranged on the second part-circular gliding surface of the second shutter body.

Advantageously, the first and second shutter body are mechanically connectable via at least one connection device, wherein the connection device comprises a first and second engaging element, and wherein the first and second engaging element are connectable to each other such that when connected, the connection device limits the rotation of the first and second shutter body relative to each other around the common rotation axis.

Advantageously, the first engaging element is arranged on the first or second shutter body and the second engaging element is arranged on the second or first shutter body.

Advantageously, the first engaging element is built as a groove and the second engaging element is built as a protrusion, wherein the groove has two opposite ends, and wherein the relative motion of the first and second shutter body to each other is restricted when the protrusion abuts on the respective ends of the groove.

Advantageously, the transmission element is rotatable in different angular ranges starting from a zero position in which the common shutter edge of the shutter device is straight and horizontal—seen in a correctly installed state of the illumination device in a vehicle—, wherein in a first angular range the transmission element engages with the first and second shutter body in a way that both shutter bodies are moved together around the common rotational axis and are in aligned positions, in a second angular range—starting from the end of the first angular range—the transmission element engages with the shutter bodies in a way that only the first shutter body is moved by the transmission element causing non-aligned positions of the first and second shutter body, wherein the second angular range ends when the connection device restricts the relative rotation of the first and second shutter body to each other, and in a third angular range—starting from the end of the second angular range—the transmission element engages with the shutter bodies in a way that only the first shutter body is moved by the transmission element, wherein the second shutter body is rotated around the common rotation axis to the same extent by means of the connection device.

Advantageously, the first angular range is from 0° to 6°, the second angular range is from 6° to 12°, and the third angular range starts from 12°.

Advantageously, the first and second shutter plane is 3° to 5°, preferably 4°, tilted away from the optical axis.

Advantageously, the at least one light source is mounted on the holder.

Advantageously, the illumination device comprises a plurality of light sources, preferably a plurality of LEDs, wherein preferably for each light source at least one collimator element configured to collimate light is assigned to it.

Advantageously, the main direction is parallel to the optical axis, preferably also to the common rotation axis.

Advantageously, the shutter device comprises a reset element configured to bring the first and second shutter body from a maximum tilt in a non-aligned position to an aligned position.

Advantageously, the reset element is formed as a spring.

Advantageously, the spring comprises a first and second arm.

Advantageously, the first shutter body comprises a first reset holder configured to hold the first arm of the spring, and wherein the second shutter body comprises a second reset holder configured to hold the second arm of the spring, and wherein the spring is not spring-loaded when the shutter device is in the zero position.

Advantageously, the first and/or second shutter body comprises at least one weight element configured to support the respective shutter body into a zero position.

The object is also achieved by a stabilized illumination device for irradiating a stabilized light distribution, comprising at least one illumination device according to the invention, an external control unit and at least one roll angle sensor configured to determine a roll angle from a defined standard position of the illumination device around the main direction, said external control unit is configured to frequently, preferably constantly, receive a roll angle from the at least one roll angle sensor and to control the transmission element depending on the roll angle in order to maintain a stabilized light distribution.

The object is also achieved by a motorcycle headlamp comprising at least one illumination device according to the invention and/or at least one stabilized illumination device according to the invention.

BRIEF DESCRIPTION OF THE DRAWINGS

In the following, in order to further demonstrate the present invention, illustrative and non-restrictive embodiments are discussed, as shown in the drawings.

DETAILED DESCRIPTION

Figure 1A:
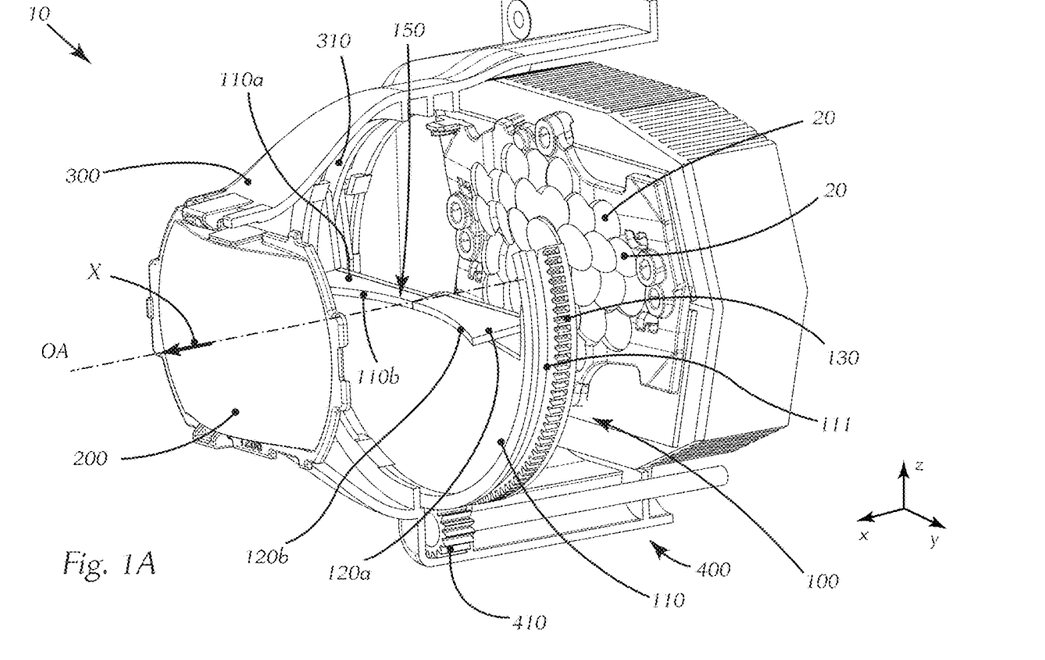
FIG. 1A is a perspective front view of an example of an illumination device comprising light sources, a shutter device, comprising a first and second shutter body, and a projection lens for generating a light distribution with a cut-off line projected in front of the illumination device, wherein the first and second shutter body is moved by means of a rotation device.

FIG. 1A shows an illumination device 10 for vehicle headlamps, especially for single-track vehicle headlamps, in particular for motorcycle headlamps, wherein the illumination device 10 is configured to form a light distribution with a cut-off line.

The illumination device 10 comprises light sources 20 configured to emit light in a main direction X for forming the light distribution. Preferably the light sources are LEDs, wherein preferably for each light source 20 at least one collimator element configured to collimate light is assigned to it. Further, the illumination device 10 comprises a shutter device 100 arranged downstream of the light sources 20 along the main direction X, wherein the shutter device 100 is configured to generate the cut-off line in the light distribution.

Moreover, the illumination device 10 comprises a projection lens 200 for projecting the generated light distribution of the light sources 20 in conjunction with the shutter device 100 in front of the illumination device 10, wherein the projection lens 200 comprises an optical axis A.

Further, the illumination device 10 comprises a holder 300 configured to hold the shutter device 100 and the projection lens 200, also the light sources 20 are mounted on the holder 300. The shutter device 100 is formed of a first shutter body 110 with a first shutter plane 110a comprising a first shutter edge 110b, and a second shutter body 120 with a second shutter plane 120a comprising a second shutter edge 120b. Further, the first and second shutter plane 110a, 120a is 3° to 5°, preferably 4°, tilted away from the optical axis A.

The first and second shutter body 110, 120 are arranged to one another that the first and second shutter edge 110b, 120b together build a common shutter edge 150, which generates the cut-off line in the light distribution.

The shutter device 100 is configured to transition between aligned positions of the first and second shutter edge 110b, 120b, wherein the common shutter edge 150 contributes to generate a straight cut-off line, and non-aligned positions of the first and second shutter edge 110b, 120b, wherein the first and second shutter edge 110b, 120b are inclined with respect to each other, so that the common shutter edge 150 contributes to generate a cut-off line deviating from a straight cut-off line.

The transition between the positions is performed by rotation of the first and/or second shutter body 110, 120 about a common rotation axis R by means of a rotation device 400, wherein the first and second shutter body 110, 120 are rotatable independently and relative to each other about the common rotation axis R. The main direction X is parallel to the optical axis A, preferably also to the common rotation axis R.

The first shutter body 110 comprises a first part-circular gliding surface 111 complementary to a first counter circular gliding surface 310 of the holder 300, wherein the first shutter body 110 engages with the holder 300 so as the first part-circular gliding surface 111 and the first counter circular gliding surface 310 can glide on one another. The second shutter body 120 comprises a second part-circular gliding surface 121 complementary to a second counter circular gliding surface 320 of the holder 300, wherein the second shutter body 120 engages with the holder 300 so as the second part-circular gliding surface 121 and the second counter circular gliding surface 320 can glide on one another, as can be seen in FIG. 1A and FIG. 1B.

Figure 2A:
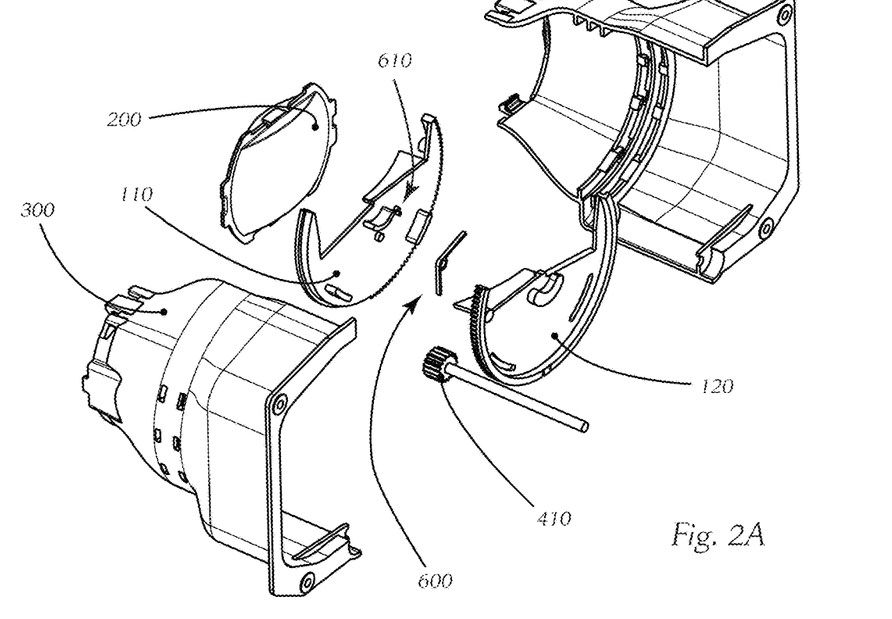
FIG. 2A is an explosive front view of the illumination device in FIG. 1A, showing a reset element which is disposed between the first and second shutter body.
Figure 2B:
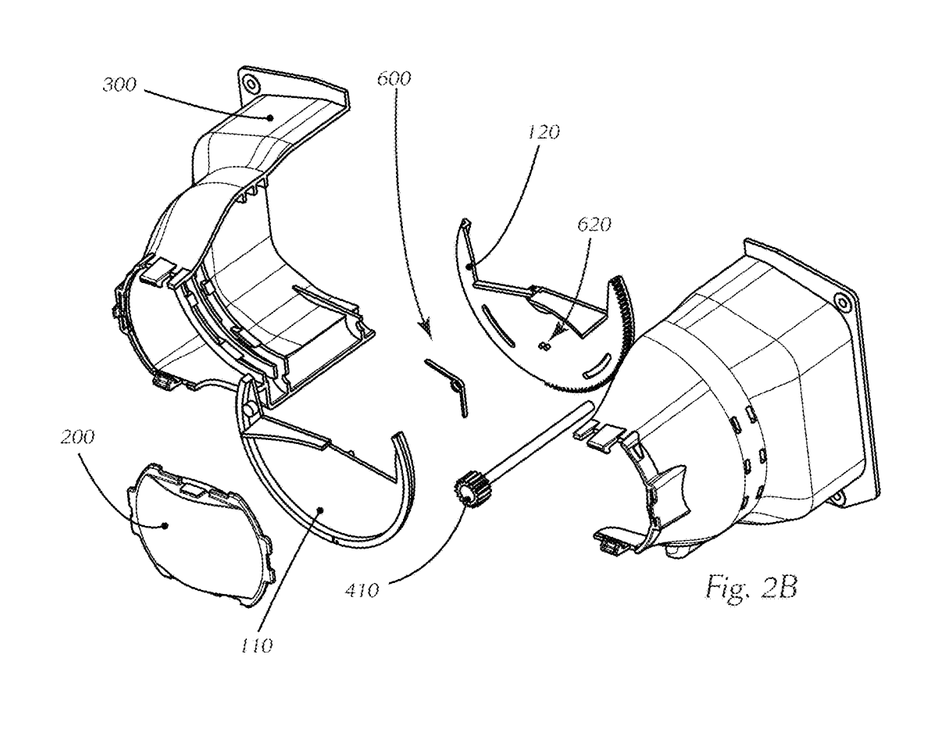
FIG. 2B is an explosive back view of the illumination device in FIG. 1B.

Further, the shutter device 100 comprises a reset element 600 configured to bring the first and second shutter body 110, 120 from a maximum tilt in a non-aligned position to an aligned position. The reset element 600 is formed as a spring and is arranged between the first and second shutter body 110, 120. Moreover, the reset element 600 comprises a first and second arm, wherein first shutter body 110 comprises a first reset holder 610 configured to hold the first arm of the spring, and wherein the second shutter body 120 comprises a second reset holder 620 configured to hold the second arm of the spring, as can be seen in FIG. 2A and FIG. 2B.

Figure 1B:
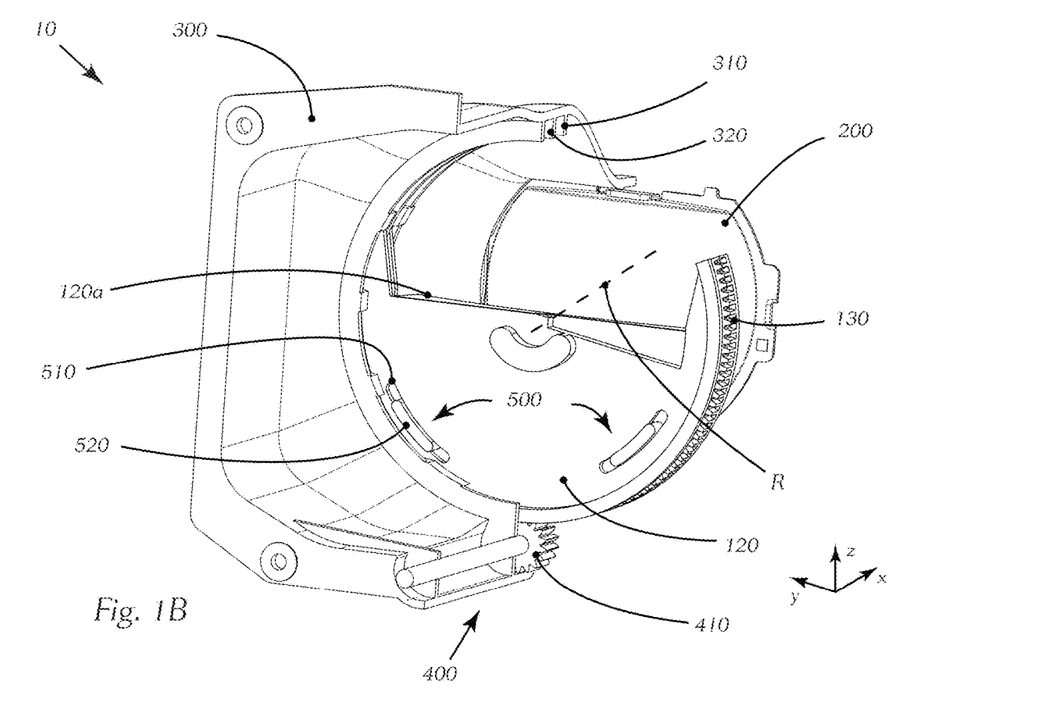
FIG. 1B is a perspective rear view of the illumination device of FIG. 1A.
Figure 3A:
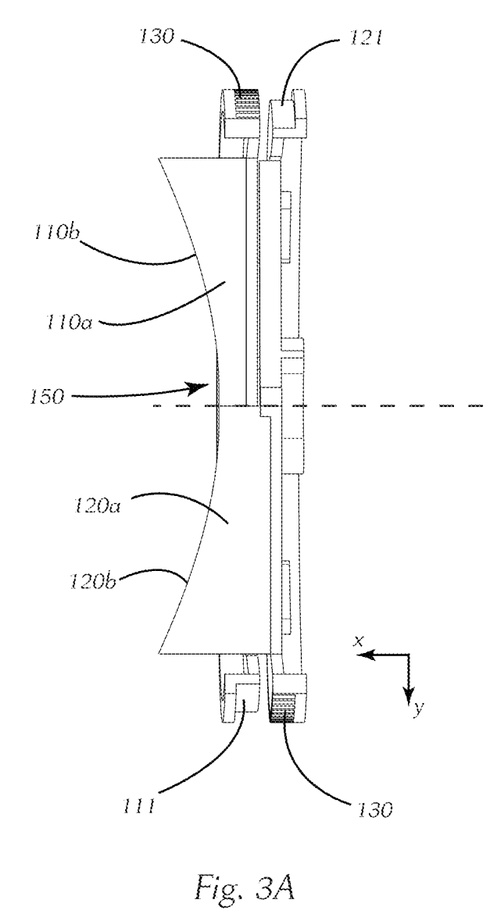
FIG. 3A is a detailed view of the shutter device from above, wherein the first and second shutter body each comprising a toothed array.
Figure 3B:
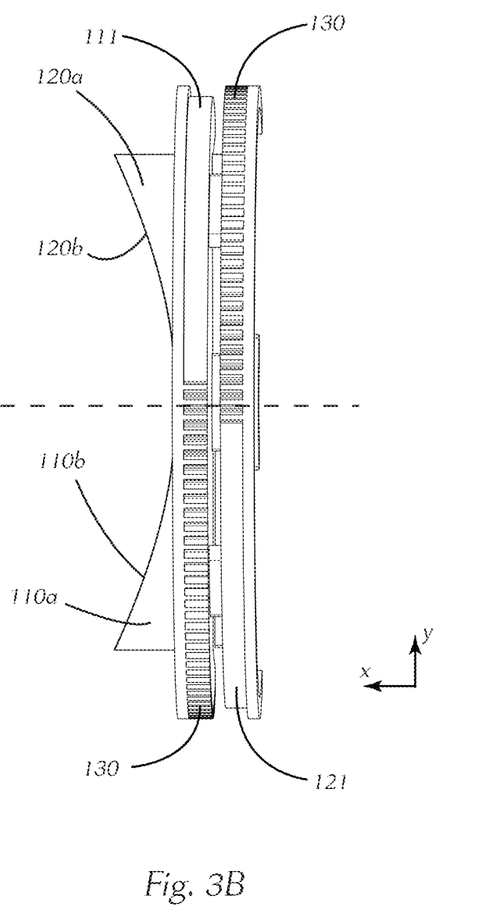
FIG. 3B is a detailed view of the shutter device from below, wherein the shutter bodies are in an aligned position or a zero position in which a common shutter edge is straight and horizontal seen in a correctly installed state of the illumination device in a vehicle, wherein in this zero position the toothed arrays of the respective shutter bodies overlap.

As also can be seen in FIG. 1A and FIG. 1B, the rotation device 400 comprises a transmission element 410 formed as a toothed wheel configured to engage with a toothed array 130 of the first and/or second shutter body 110, 120 in order to convert an angular motion of the transmission element 410 into a rotation motion of the first and/or second shutter body 110, 120 around the common rotation axis R. In FIG. 3A and FIG. 3B one can see the toothed array 130 which is arranged on each shutter body 110, 120. Also, as can be seen in FIG. 3B, the shutter device 100 is in a zero position in which the common shutter edge 150 of the shutter device 100 is straight and horizontal—seen in a correctly installed state of the illumination device in a vehicle, and wherein the toothed arrays 130 of the shutter bodies 110, 120 overlaps to some degree. In this zero position, the transmission element 410 engages with the toothed arrays 130 of both shutter bodies 110, 120, whereas and wherein the reset element 600 is not spring-loaded when the shutter device 100 is in the zero position.

Further, the first and second shutter body 110, 120 are mechanically connectable via at least one connection device 500, wherein the connection device 500 comprises a first and second engaging element 510, 520, and wherein the first and second engaging element 510, 520 are connectable to each other such that when connected, the connection device 500 limits the rotation of the first and second shutter body 110, 120 relative to each other around the common rotation axis R. The first engaging element 510 is arranged on the second shutter body 120 and the second engaging element 520 is arranged on the first shutter body 110.

The first engaging element 510 is built as a groove and the second engaging element 520 is built as a protrusion, wherein the groove has two opposite ends, and wherein the relative motion of the first and second shutter body 110, 120 to each other is restricted when the protrusion abuts on the respective ends of the groove as best can be seen in FIG. 1B and FIG. 5A to FIG. 5D.

Further, the transmission element 410 is rotatable in different angular ranges AR1, AR2, AR3 starting from the zero position in which the common shutter edge 150 of the shutter device 100 is straight and horizontal—seen in a correctly installed state of the illumination device in a vehicle, wherein in a first angular range AR1 the transmission element 410 engages with the first and second shutter body 110, 120 in a way that both shutter bodies 110, 120 are moved together around the common rotational axis R and are in aligned positions.

In a second angular range AR2—starting from the end of the first angular range AR1—the transmission element 410 engages with the shutter bodies 110, 120 in a way that only the second shutter body 120 is moved by the transmission element 410 causing non-aligned positions of the first and second shutter body 110, 120, wherein the second angular range AR2 ends when the connection device 500 restricts the relative rotation of the first and second shutter body 110, 120 to each other.

In a third angular range AR3—starting from the end of the second angular range AR2—the transmission element 410 engages with the shutter bodies 110, 120 in a way that only the second shutter body 110 is moved by the transmission element 410, wherein the first shutter body 120 is rotated around the common rotation axis R to the same extent by means of the connection device 500.

The first angular range AR1 ranges from 0° to 6°, the second angular range AR2 from 6° to 12°, and the third angular range AR3 starts from 12°.

Figure 4A:
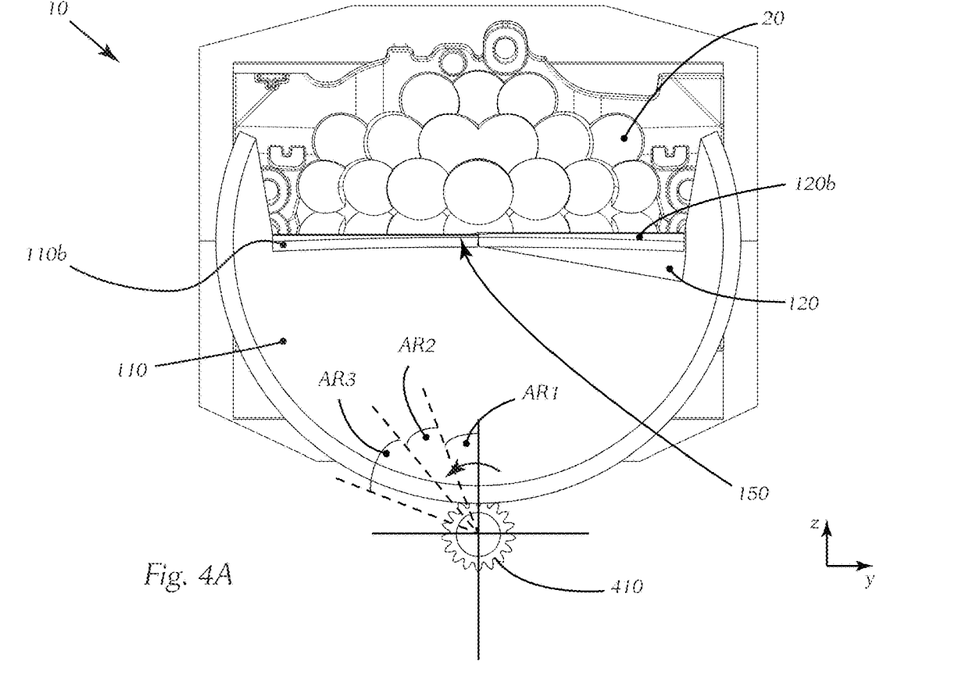
FIG. 4A is a front view of the illumination device in FIG. 1A, wherein the shutter device is in the zero position.
Figure 4B:
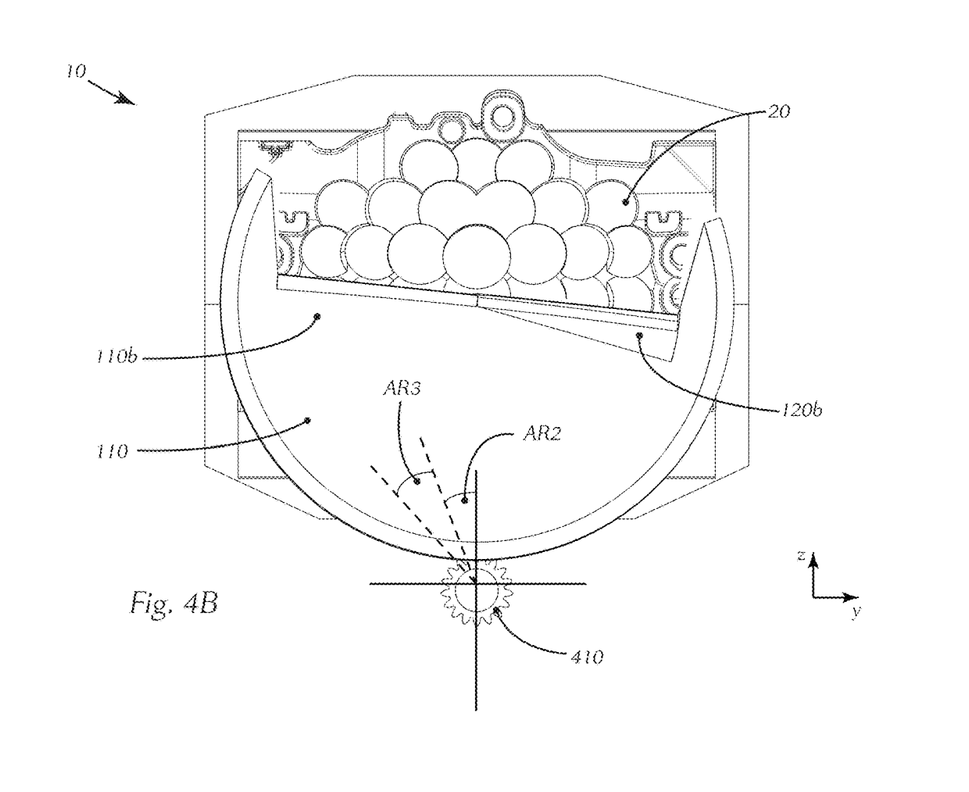
FIG. 4B is a front view of the illumination device in FIG. 1A and FIG. 4B, wherein the rotation device is moved in a first angular range where the shutter bodies are moved from the zero position in a further aligned position.

FIG. 4A shows a front view of the illumination device 10 without the projection lens 200, wherein the shutter device 100 is in the zero position, and wherein the mentioned angular ranges AR1, AR2, AR3 are indicated. In FIG. 4B, the shutter device 100 is shown in a tilted manner within the first angular range AR1, or to be specific, at the end of the first angular range AR1, wherein the shutter device 100 is still in an aligned position. To obtain this position, the transmission element 410 was—seen in this front view—rotated counter-clockwise.

Figure 5A:
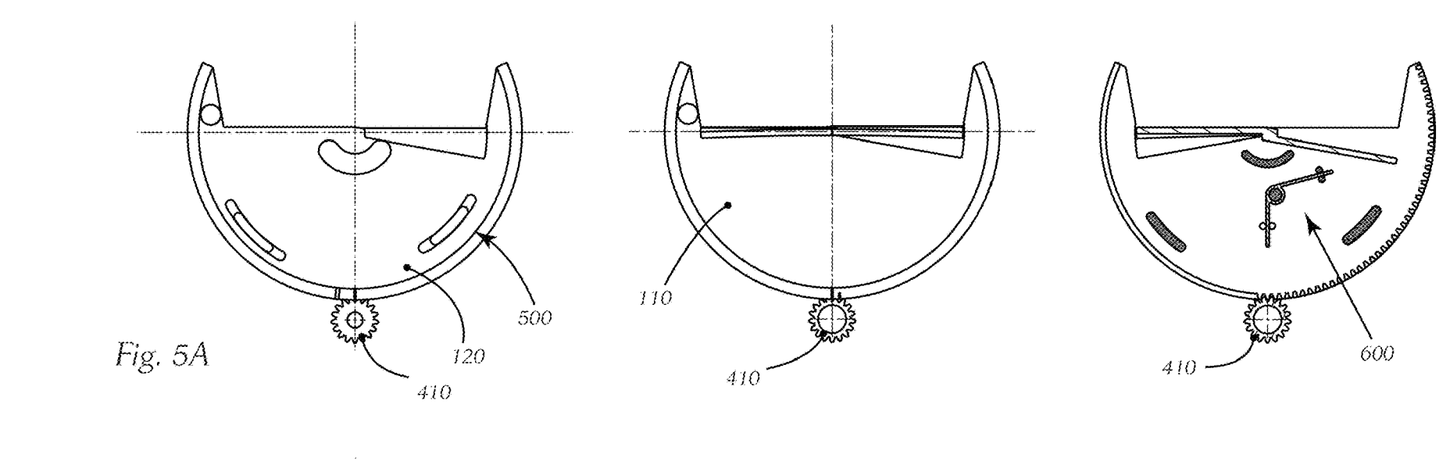
FIG. 5A is the shutter device in a front view, back view and view showing the space between the shutter bodies with the reset element formed as a spring in the shown embodiment, wherein the shutter device is in the zero position, and the spring is not spring-loaded.
Figure 5B:
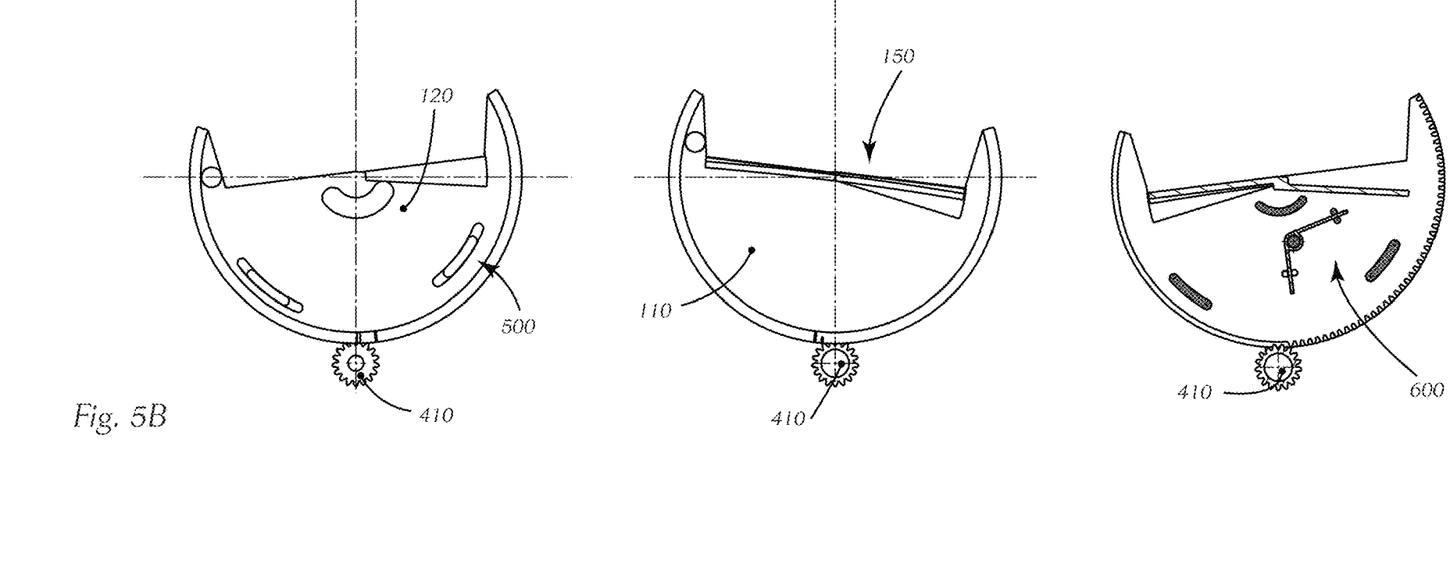
FIG. 5B is the shutter device in a front view, back view and view showing the space between the shutter bodies with the spring, wherein the transmission element is moved in a first angular range, wherein the shutter device is in an aligned position, and the spring is not spring-loaded.

FIG. 5A, which shows a back view, front view and a middle view, where one can see the spring 600, respectively, wherein the shutter device 100 is in the zero position. FIG. 5B shows the same views, but the shutter device 100 is tilted via the transmission element 410 in the first angular range AR1—as already introduced in FIG. 4A and FIG. 4B, wherein the spring 600 is not spring-loaded. This position is achieved by rotating the transmission element 410—seen in the front view—counter clockwise. In the zero position, the transmission element 410 engages with the toothed arrays 130 of both shutter bodies 110, 120 (shown in FIG. 3A and FIG. 3B) as both toothed arrays 130 are overlapping as can be seen in FIG. 3B, enabling the tilting of both shutter bodies 110, 120 in the same manner. Also, in the first angular range AR1, the spring 600 is not spring-loaded.

Figure 5C:
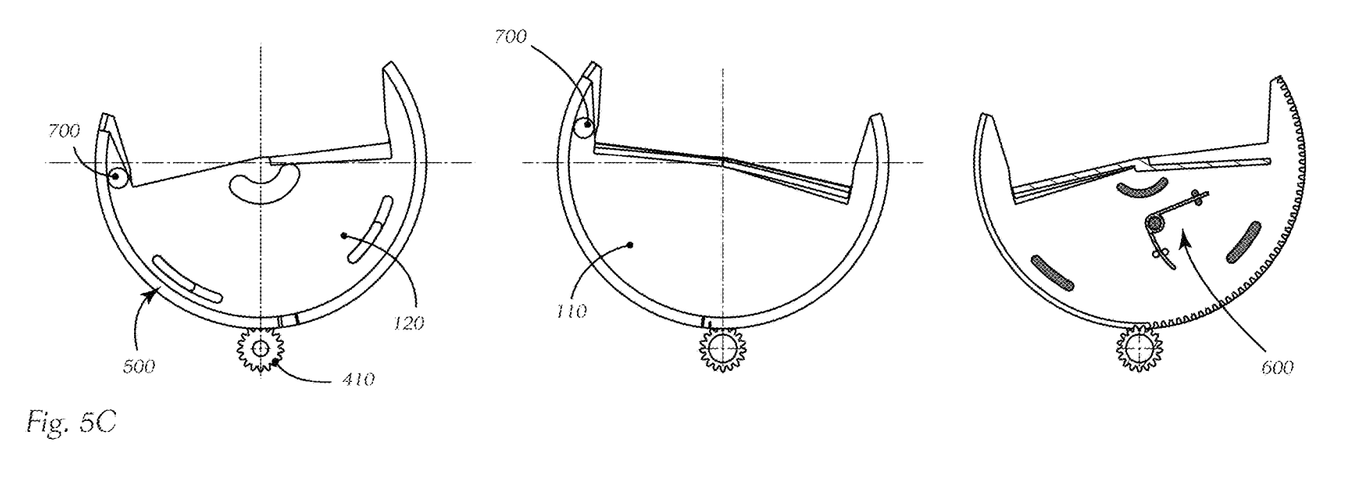
FIG. 5C is the shutter device in a front view, back view and view showing the space between the shutter bodies with the spring, wherein the transmission element is moved in a second angular range, wherein the shutter device is in a non-aligned position, and wherein the spring is spring-loaded.

In FIG. 5C, the transmission element 410—seen in the front view—is rotated further counter-clockwise causing only the second shutter body 120 to rotate as the transmission element 410 is only engaging with the toothed array 130 of the second shutter body 120 at the end of the first angular range AR1 (or the beginning of the second angular range AR2). In this way, a non-aligned position is achieved and the spring 600 is spring-loaded, wherein the second angular range AR2 ends when the connection device 500 restricts the relative rotation of the first and second shutter body 110, 120 to each other, as can be seen in FIG. 5C.

Figure 5D:
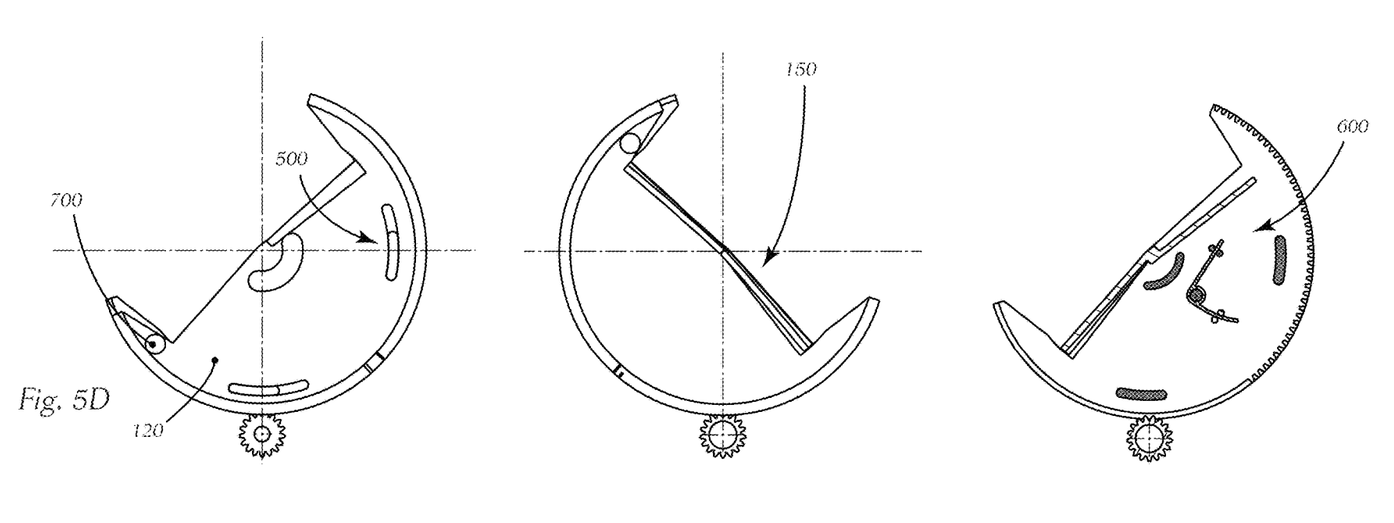
FIG. 5D is the shutter device in a front view, back view and view showing the space between the shutter bodies with the spring, wherein the transmission element is moved in a third angular range, wherein the shutter device is in a non-aligned position, and wherein the spring is spring-loaded.

In FIG. 5D, the transmission element 410—seen in the front view—is rotated further counter-clockwise, the transmission element 410 engages with the shutter bodies 110, 120 in a way that only the second shutter body 110 is moved by the transmission element 410, wherein the first shutter body 120 is rotated around the common rotation axis R to the same extent by means of the connection device 500—the spring 600 is still spring-loaded.

In the reverse motion, the spring 600 assists to bring the shutter bodies 110, 120 back into an aligned position.

It should be noted that, despite the fact that in the shown figures only one tilting direction was shown, the abovementioned also applies to the opposite tilting direction.

Figure 6A:
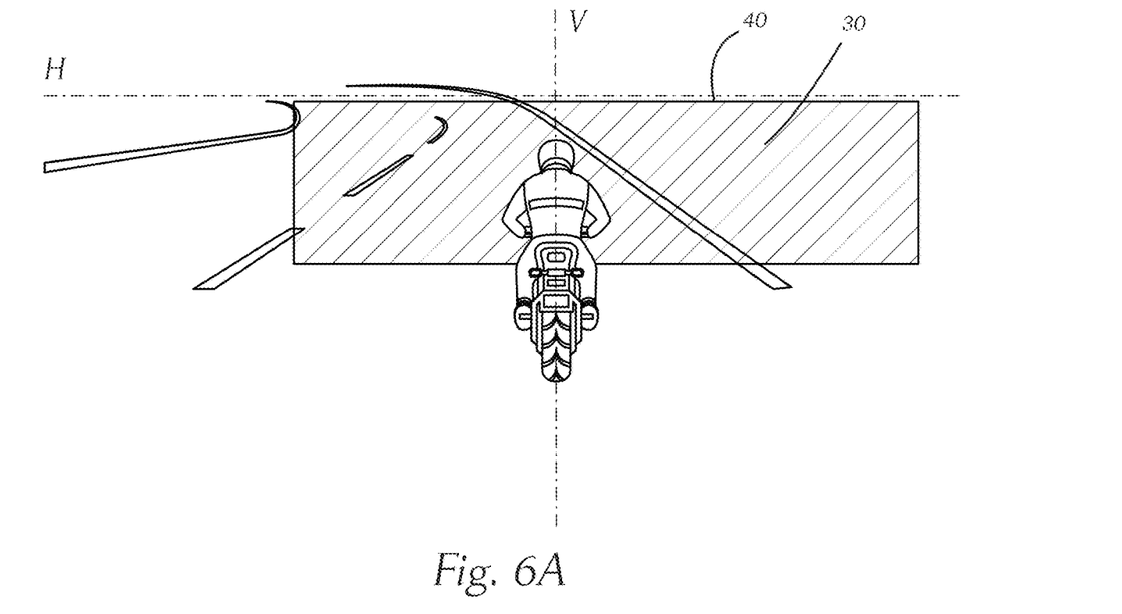
FIG. 6A shows a motorcycle on a street, wherein the motorcycle comprises a stabilized illumination device, which projects a light distribution with a straight and horizontal cut-off line onto the street, wherein the motor cycle is in a standard position.
Figure 6B:
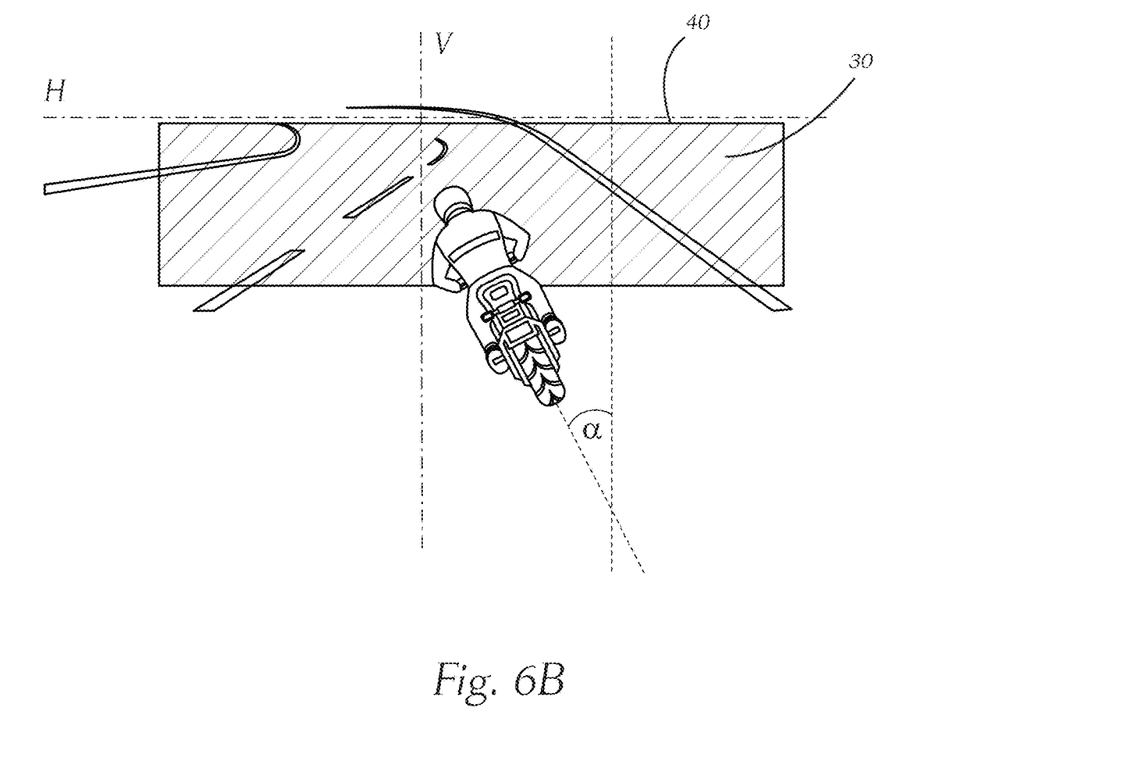
FIG. 6B shows the motorcycle inclines to a roll angle greater zero, wherein the horizontal alignment of the light distribution is maintained.

Further, FIG. 6A and FIG. 6B shows a motor vehicle on a street, wherein the motor vehicle comprises a stabilized illumination device for irradiating a stabilized light distribution 30, comprising an abovementioned illumination device, an external control unit and at least one roll angle sensor configured to determine a roll angle α from a defined standard position of the illumination device or the motor vehicle around the main direction X, said external control unit is configured to frequently, preferably constantly, receive a roll angle α from the at least one roll angle sensor and to control the transmission element 410 depending on the roll angle in order to maintain a stabilized light distribution or to adjust the light distribution depending on the roll angle α.

In FIG. 6A the motor vehicle is in a standard position—therefore the illumination device 10—and projects a light distribution 30 with a straight and horizontal cut-off line 40 onto the street. In this standard position of the motor vehicle, the shutter device 100 of the illumination device 10 is in the zero position.

In FIG. 6B the motor cycle inclines to a roll angle α greater than zero, wherein the horizontal alignment of the light distribution 30 is maintained, so that the cut-off line 40 maintains in a straight horizontal line.

| LIST OF REFERENCE SIGNS | | |
|---|---|---|
| Illumination device . . . | | 10 |
| Light sources . . . | | 20 |
| Light distribution . . . | | 30 |
| Cut-off line . . . | | 40 |
| Shutter device . . . | | 100 |
| First shutter body . . . | | 110 |
| First shutter plane . . . | | 110a |
| First shutter edge . . . | | 110b |
| First part circular gliding surface . . . | 111 | |
| Second shutter body . . . | | 120 |
| Second shutter plane . . . | | 120a |
| Second shutter edge . . . | | 120b |
| Second part circular gliding surface . . . | | 121 |
| Common shutter edge . . . | | 150 |
| Projection lens . . . | | 200 |
| Holder . . . | | 300 |
| First counter circular gliding surface . . . | | 310 |
| Second counter circular gliding surface . . . | 320 | |
| Rotation device . . . | | 400 |
| Transmission element . . . | | 410 |
| Connection device . . . | | 500 |
| First engaging element . . . | | 510 |
| Second engaging element . . . | | 520 |
| Reset element . . . | | 600 |
| First reset holder . . . | | 610 |
| Second reset holder . . . | | 620 |
| Weight element . . . | | 700 |
| First angular range . . . | | AR1 |
| Second angular range . . . | | AR2 |
| Third angular range . . . | | AR3 |
| Roll angle . . . | | α |
| Main direction . . . | | X |
| Optical axis . . . | | A |
| Rotation axis . . . | | R |

The invention claimed is:

1. An illumination device (10) for single-track vehicle headlamps, wherein the illumination device (10) is configured to form a light distribution with a cut-off line, the illumination device comprising:
at least one light source (20) configured to emit light in a main direction (X) for forming the light distribution;
a shutter device (100) arranged downstream of the at least one light source (20) along the main direction (X), wherein the shutter device (100) is configured to generate the cut-off line in the light distribution;
a projection lens (200) for projecting the generated light distribution of the at least one light source (20) in conjunction with the shutter device (100) in front of the illumination device (10), wherein the projection lens (200) comprises an optical axis (A); and
a holder (300) configured to hold the shutter device (100) and the projection lens (200),
wherein the shutter device (100) is formed of:
a first shutter body (110) with a first shutter plane (110a) comprising a first shutter edge (110b), and a second shutter body (120) with a second shutter plane (120*a*) comprising a second shutter edge (120*b*), wherein the first and second shutter body (110, 120) are arranged to one another such that the first and second shutter edge (110*b*, 120*b*) together build a common shutter edge (150), which generates the cut-off line in the light distribution, wherein the shutter device (100) is configured to transition between aligned positions of the first and second shutter edge (110*b*, 120*b*), wherein the common shutter edge (150) contributes to generate a straight cut-off line, and non-aligned positions of the first and second shutter edge (110*b*, 120*b*), wherein the first and second shutter edge (110*b*, 120*b*) are inclined with respect to each other, so that the common shutter edge (150) contributes to generate a cut-off line deviating from a straight cut-off line, and wherein the transition between the positions is performed by rotation of the first and/or second shutter body (110, 120) about a common rotation axis (R) by means of a rotation device (400).

2. The illumination device according to claim 1, wherein the first and second shutter bodies (110, 120) are rotatable independently and relative to each other about the common rotation axis (R).

3. The illumination device according to claim 1, wherein the first shutter body (110) comprises a first part-circular gliding surface (111) complementary to a first counter circular gliding surface (310) of the holder (300), wherein the first shutter body (110) engages with the holder (300) so that the first part-circular gliding surface (111) and the first counter circular gliding surface (310) can glide on one another.

4. The illumination device according to claim 1, wherein the second shutter body (120) comprises a second part-circular gliding surface (121) complementary to a second counter circular gliding surface (320) of the holder (300), wherein the second shutter body (120) engages with the holder (300) so that the second part-circular gliding surface (121) and the second counter circular gliding surface (320) can glide on one another.

5. The illumination device according to claim 4, wherein each shutter body (110, 120) comprises a toothed array (130), which is sectionally arranged on the first part-circular gliding surface on the first shutter body (110), and sectionally arranged on the second part-circular gliding surface of the second shutter body (120).

6. The illumination device according to claim 1, wherein the rotation device (400) comprises a transmission element (410) formed as a toothed wheel configured to engage with a toothed array (130) of the first and/or second shutter body (110, 120) in order to convert an angular motion of the transmission element (410) into an rotation motion of the first and/or second shutter body (110, 120) around the common rotation axis (R).

7. The illumination device according to claim 6, wherein the main direction (X) is parallel to the optical axis (A) and to the common rotation axis (R).

8. The illumination device according to claim 1, wherein the first and second shutter body (110, 120) are mechanically connectable via at least one connection device (500), wherein the connection device (500) comprises a first and second engaging element (510, 520), and wherein the first and second engaging element (510, 520) are connectable to each other such that when connected, the connection device (500) limits the rotation of the first and second shutter body (110, 120) relative to each other around the common rotation axis (R).

9. The illumination device according to claim 8, wherein the first engaging element (510) is arranged on the first or second shutter body (110, 120) and the second engaging element (520) is arranged on the second or first shutter body (110, 120).

10. The illumination device according to claim 8, wherein the first engaging element (510) is built as a groove and the second engaging element (520) is built as a protrusion, wherein the groove has two opposite ends, and wherein the relative motion of the first and second shutter body (110, 120) to each other is restricted when the protrusion abuts on the respective ends of the groove.

11. The illumination device according to claim 8, wherein the transmission element (410) is rotatable in different angular ranges (AR1, AR2, AR3) starting from a zero position in which the common shutter edge (150) of the shutter device (100) is straight and horizontal—seen in a correctly installed state of the illumination device (10) in a vehicle, wherein:

in a first angular range (AR1) the transmission element (410) engages with the first and second shutter body (110, 120) in a way that both shutter bodies (110, 120) are moved together around the common rotational axis (R) and are in aligned positions, in a second angular range (AR2)—starting from the end of the first angular range (AR1)—the transmission element (410) engages with the shutter bodies (110, 120) in a way that only the first shutter body (110) is moved by the transmission element (410) causing non-aligned positions of the first and second shutter body (110, 120), wherein the second angular range (AR2) ends when the connection device (500) restricts the relative rotation of the first and second shutter body (110, 120) to each other, and in a third angular range (AR3)—starting from the end of the second angular range (AR2)—the transmission element (410) engages with the shutter bodies (110, 120) in a way that only the first shutter body (110) is moved by the transmission element (410), wherein the second shutter body (120) is rotated around the common rotation axis (R) to the same extent by means of the connection device (500).

12. The illumination device according to claim 11, wherein the first angular range (AR1) is from 0° to 6°, the second angular range (AR2) is from 6° to 12°, and the third angular range (AR3) starts from 12°.

13. A stabilized illumination device for irradiating a stabilized light distribution, comprising:

at least one illumination device (10) according to claim 11;

an external control unit; and at least one roll angle sensor configured to determine a roll angle ($\alpha$) from a defined standard position of the illumination device around the main direction (X), wherein the external control unit is configured to frequently receive a roll angle ($\alpha$) from the at least one roll angle sensor and to control the transmission element (410) depending on the roll angle ($\alpha$) in order to maintain a stabilized light distribution (30).

14. The stabilized illumination device according to claim 13, wherein the external control unit is configured to constantly receive the roll angle ($\alpha$) from the at least one roll angle sensor.

15. The illumination device according to claim 1, wherein each of the first and second shutter planes (110*a*, 120*a*) is 3° to 5° tilted away from the optical axis (A).

16. The illumination device according to claim 15, wherein each of the first and second shutter planes (110*a*, 120*a*) is 4° tilted away from the optical axis (A).

17. The illumination device according to claim 1, wherein the illumination device (10) comprises a plurality of light sources (20), wherein for each light source (20) at least one collimator element configured to collimate light is assigned to it.

18. The illumination device according to claim 17, wherein the plurality of light sources (20) comprise a plurality of LEDs.

19. A motorcycle headlamp comprising at least one illumination device (10) according to claim 1.

20. The illumination device according to claim 1, wherein the at least one light source (20) is mounted on the holder (300).

\* \* \* \* \*